Jan. 20, 1953     E. H. OWENS     2,625,951

SAFETY DEVICE FOR HYDRAULIC BRAKES

Filed Jan. 16, 1950

Elmer H. Owens
INVENTOR.

BY Clarence A O'Brien
and Harvey B. Jacobson
Attorneys

Patented Jan. 20, 1953

2,625,951

UNITED STATES PATENT OFFICE 2,625,951

SAFETY DEVICE FOR HYDRAULIC BRAKES

Elmer H. Owens, Tarpon Springs, Fla.

Application January 16, 1950, Serial No. 138,833

1 Claim. (Cl. 137—517)

This invention relates to new and useful improvements and structural refinements in safety devices for hydraulic brakes such as are commonly used on automobiles, airplanes, or the like, and the principal object of the invention is to prevent complete failure of the brake system resulting from loss of hydraulic fluid in the event of leakage at one of the wheel cylinders or connecting lines.

This object is achieved by the provision of what may be referred to as a check cylinder which is adapted for installation between different portions of a hydraulic system, such as for example, between a wheel cylinder and a master cylinder, an important feature of the invention residing in the provision of means within the check cylinder for isolating one portion of the hydraulic system from the other so as to prevent complete loss of fluid and failure of the system as a whole.

Some of the advantages of the invention reside in its simplicity of construction, in its safe and dependable operation, and in its adaptability for use in hydraulic brake systems of different types.

With the above more important objects and features in view and such other objects and features as may become apparent as this specification proceeds, the invention consists essentially of the arrangement and construction of parts as illustrated in the accompanying drawings, in which.

Like characters of reference are employed to designate like parts in the specification and throughout the several views.

Figure 1:
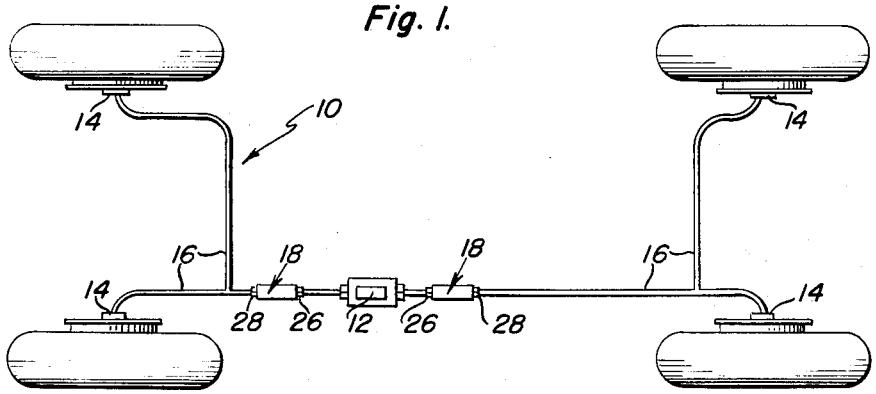
Figure 1 is a diagrammatic view of a hydraulic brake system showing the invention embodied therein.

Referring now to the accompanying drawings in detail, the general reference character 10 designates a hydraulic brake system including a master cylinder 12 and a plurality of wheel cylinders 14 which are connected to the master cylinder by suitable lines 16, as will be clearly apparent.

The invention consists of a safety device designated generally by the reference character 18, which is intended for installation in the lines 16 between the master cylinder and the wheel cylinders, as exemplified in Figure 1. Needless to say, as many of the devices 18 may be employed in the same brake system as necessary.

The safety device 18 embodies in its construction what may be referred to as a check cylinder 20 which is provided with an axial bore 22, the latter having its end portions screw threaded as at 24 to receive suitable coupling nuts 26, 28 whereby the hydraulic line 16 may be connected to the check cylinder substantially as shown. The two different reference numerals have been assigned to the respective coupling nuts so as to distinguish between the nut 26 which is located adjacent the master cylinder 12 and the nut 28 which is located adjacent the wheel cylinder.

A washer 30 provided with a central opening 32 is positioned in the bore 22 against the inner end of the nut 28 and affords what may be referred to as a valve seat, the function of which will hereinafter become apparent.

Moreover, the tubular piston stop 34 is pressed in the bore 22 in abutment with the valve seat 30, while a piston 36 is slidable between this valve stop and the coupling nut 26.

A compression spring 38 is positioned in the bore 22 and extends into the piston stop 34 to abut, at one end thereof, the valve seat 30, while the remaining end of the spring bears against the piston 36 for urging the latter toward the coupling nut 26. The "head" 40 of the piston 36 is provided with a plurality of protuberances or lugs 42 which are engageable with the coupling nut 26 and thus retain the head 40 of the piston at a distance from that coupling nut, and it is to be observed that a portion of the cylinder 20 adjacent the coupling nut 26 is provided with a passage 44 communicating at longitudinally spaced points with the bore 22 and affording a by-pass around the piston when the latter is slid toward the nut 26 by the spring 28. The aforementioned protuberances or lugs 42 provided on the piston head assure, of course, that the piston is not slid too far by the spring 38 so as to close the by-pass 44, and it is to be noted that the lugs 42 are spaced inwardly from the marginal edge of the head 40 and, consequently, from the wall of the bore 22, so that they do not obstruct the by-pass 44.

Figure 3:
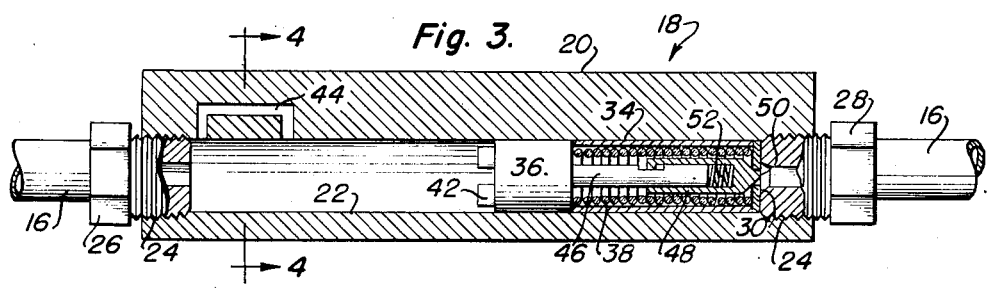
Figure 3 is a longitudinal sectional view, similar to that shown in Figure 2 but illustrating the invention as it appears in the presence of a leak in the system.
Figure 5:
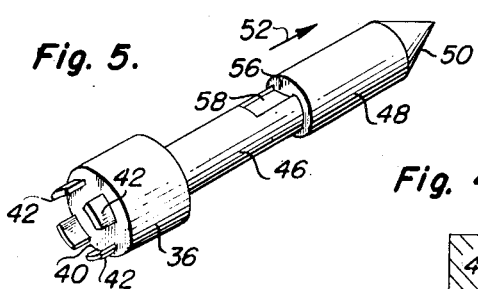
Figure 5 is a perspective view of a piston and valve member used in the invention.
Figure 6:
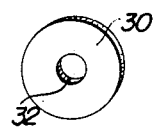
Figure 6 is a perspective view of a valve seat used therein.
Figure 4:
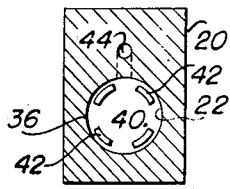
Figure 4 is a cross-sectional detail, taken substantially in the plane of line 4—4 in Figure 3.

The piston 36 is formed integrally with a shank or stem 46 on which, in turn, is slidably mounted a hollow cap 48 having a conical extremity 50 constituting a valve element which is engageable with the aforementioned valve seat 30. The hollow head 48 contains a compression spring 52 which abuts the outer end of the stem 46 to urge the head in the direction of the arrow 54 (see Figure 5) it being understood that the head 48 is slidable on the stem 46 but is prevented from becoming separated therefrom by means of an inturned lug or crimped portion 56 on the head 48, which portion or lug extends into a depression or recess 58 provided in the stem 46, thus limiting the extent of sliding movement of the head 48 on the stem. Collectively speaking, the stem 46 together with the associated head 48 and the valve element 50 may be designated as a valve member which cooperates with the aforementioned valve seat 30 when the associated piston 36 is slid to the position shown in Figure 3.

Figure 2:
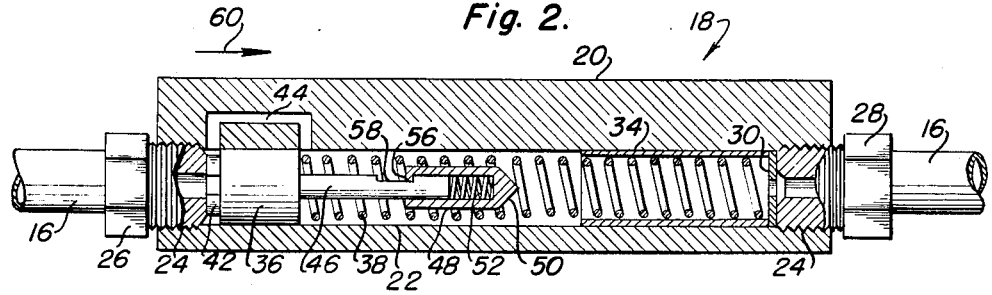
Figure 2 is a longitudinal sectional view of the invention per se, shown in a normal operating position.

When the invention is placed in use under normal conditions, that is, in the absence of a leak in the hydraulic brake system, fluid pressure from the master cylinder 12 will be transmitted by the brake line through the coupling nut 26 to the head 40 of the piston 36, and as a result, the latter will be slid in the direction of the arrow 60 from its initial position shown in Figure 2 and will impart pressure to the body of fluid in the bore 22, which pressure, in turn, will be transmitted to the wheel cylinders. The distance between the coupling nut 26 and the piston stop 34 is sufficient to permit the piston to slide in the direction of the arrow 60 so as to fully apply the brakes without the piston actually coming in engagement with the stop 34, even after normal wear of the brake lining has occurred.

However, if a leak should occur in the hydraulic system, either in the wheel cylinders or in the lines between the wheel cylinders and the safety device 18, the pressure transmitted from the master cylinder will cause the piston 36 to slide in the direction of the arrow 60 until it abuts the stop 34, while the valve element 50 will engage the valve seat 30 and thus isolate the damaged portion of the hydraulic system from the remaining portion thereof, so that complete loss of fluid and complete failure of the brake system is prevented. The resiliency of the spring 52, under such conditions, is sufficient to maintain the valve element 50 in proper engagement with the valve seat 30 while the piston 36 abuts the stop 34, so that the full fluid pressure on the piston head 40 is not transmitted to the valve 50, 30. Needless to say, after the master cylinder ceases to be actuated, the spring 38 will return the piston 36 to its initial position as shown in Figure 2.

When it is desired to "bleed" the brakes, it is only necessary to slowly actuate the master cylinder 12 so that fluid and air may by-pass the piston 36 through the passage 44 without actually sliding the piston, as will be clearly understood.

In addition to facilitate bleeding of the brakes, the by-pass 44 also provides positive means for equalizing fluid pressure at the opposite sides of the piston 36 when the brakes are not applied, thus safeguarding against the building up of excessive pressure in the wheel cylinder side of the system, such as would result from normal expansion of the fluid by heat if the by-pass were not provided.

It is believed that the advantages and use of the invention will be readily apparent from the foregoing disclosure and accordingly, further description thereof at this point is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

In a hydraulic safety device of the type described, the combination of cylinder, a pair of coupling nuts provided at the opposite ends of said cylinder for connection to hydraulic lines, an apertured disc positioned in the cylinder in abutment with one of said nuts and affording a valve seat at the center thereof, a tubular stop member positioned in an end portion of the cylinder in abutment with said disc, a piston slidable in the other end portion of the cylinder between the other coupling nut and said stop member, said cylinder being provided with a passage by-passing said piston when the latter engages the adjacent coupling nut, a compression spring positioned in said cylinder between said piston and said disc, a coaxial stem provided on one side of the piston and having an end portion formed at one side thereof with a flat-bottomed recess, said stem being disposed axially in said spring, a hollow valve head slidable on said end portion of said stem and having a tapered end engageable with said valve seat, a detent provided on said head and slidable in said recess to limit the sliding movement of the head on the stem, and a second compression spring positioned in said head in abutment with the end of said stem to urge the tapered end of the head against said seat when the piston abuts said stop member.

ELMER H. OWENS.

REFERENCES CITED

The following references are of record in the file of this patent:

UNITED STATES PATENTS

| Number | Name | Date |
|---|---|---|
| 1,614,653 | Christensen | Jan. 18, 1927 |
| 1,726,484 | Gleason et al. | Aug. 27, 1929 |
| 2,111,930 | Hinckley | Mar. 22, 1932 |
| 2,216,570 | Hollingshead | Oct. 1, 1940 |

FOREIGN PATENTS

| Number | Country | Date |
|---|---|---|
| 486,512 | Great Britain | Sept. 2, 1936 |